United States Patent

[11] 3,592,423

| [72] | Inventor | Billy Y. K. Mui<br>Astoria, N.Y. |
|---|---|---|
| [21] | Appl. No. | 857,318 |
| [22] | Filed | Sept. 12, 1969 |
| [45] | Patented | July 13, 1971 |
| [73] | Assignee | Korfund Dynamics Corporation<br>Westbury, N.Y. |

[54] LEVELING MOUNTING
2 Claims, 5 Drawing Figs.

[52] U.S. Cl............................................ 248/24,
248/188.4, 267/153
[51] Int. Cl....................................... F16f 15/00
[50] Field of Search............................. 248/15, 18,
20, 21, 24, 358, 188.4, 188.8; 16/19, 33; 267/152,
153

[56] References Cited
UNITED STATES PATENTS

| 1,564,758 | 12/1925 | Crawley | 248/24 X |
| 3,128,071 | 4/1964 | Frazer-Nash | 248/24 X |
| 3,332,647 | 7/1967 | Young | 248/24 |

FOREIGN PATENTS

| 1,449,355 | 7/1966 | France | 248/24 |

Primary Examiner—Roy D. Frazier
Assistant Examiner—J. Franklin Foss
Attorney—Brumbaugh, Graves, Donohue & Raymond ABSTRACT: A resilient leveling mounting for supporting a body and minimizing vibration which includes a housing open at the bottom, a resilient element partly within the housing and engageable with the floor upon which the body is to be supported, a rigid plate affixed to the top of the resilient element, a screw threaded through the housing with the lower end engaging the plate for securing the housing to the body and adjusting the relative positions of the resilient element and the housing for leveling purposes, and a friction coupling between the housing and the resilient element which retains the resilient element within the housing but permits relative movement for leveling the body or replacing the resilient element.

PATENTED JUL 13 1971　　3,592,423
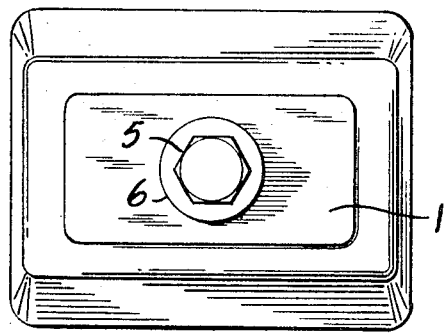
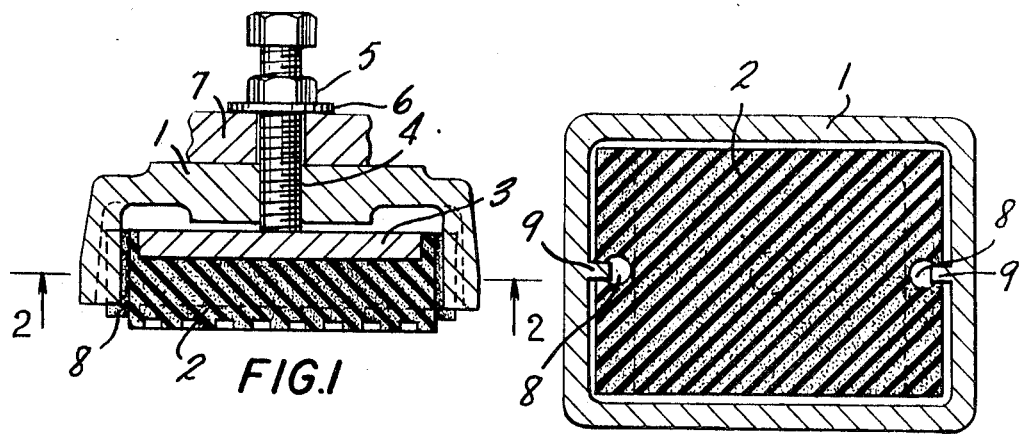
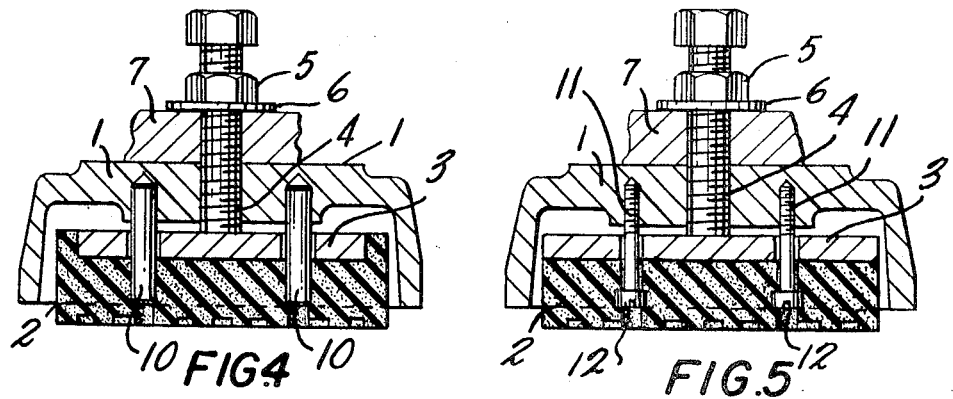
INVENTOR
BILLY Y. K. MUI
BY Brumbaugh, Graves, Donohue & Raymond
his ATTORNEYS.

LEVELING MOUNTING

This invention relates to a resilient leveling mounting for supporting a body, such as a machine, on a base to minimize vibration and to permit the part of the body to which it is mounted to be adjusted in height so that the body can be properly leveled.

Resilient leveling mountings in which a resilient element is adjustably mounted in the open bottom of a housing have heretofore been proposed but they have generally been of relatively complex construction in which the resilient element could not be readily replaced. This is a distinct disadvantage because the resilient element cannot be replaced with another of different load-carrying capacity in the event that it should become desirable to do so.

In one conventional leveling mounting described in the Crede U.S. Pat. No. 2,739,774, issued Mar. 27, 1956, the resilient element is formed with a peripheral flange which is bonded to the housing, and the peculiar shape of the flange requires it to roll, bend and stretch to permit the necessary relative movement between the housing and the main portion of the resilient element which engages the floor. In this leveling mounting the resilient element is not only not replaceable, but it must be distorted and stretched to enable it to be adjusted relative to the housing.

The leveling mounting of the present invention embodies an elongated, sliding, frictional coupling which retains the resilient element within the housing and at the same time permits it to be readily adjusted relative to the housing for leveling or easily removed for replacement.

For a complete understanding of the present invention reference can be made to the detailed description which follows and to the accompanying drawings in which:

FIG. 1 is a cross-sectional elevation of the leveling mounting of the present invention;

FIG. 2 is a sectional view taken on the line 2-2 of FIG. 1, looking in the direction of the arrows;

FIG. 3 is a plan view of the leveling mounting;

FIG. 4 is a cross-sectional elevation of an alternative form of the leveling mounting; and FIG. 5 is a cross-sectional elevation of another alternative form of the present invention.

The leveling mounting shown in FIGS. 1 through 3 of the drawings includes a housing 1 having an open bottom, a resilient element 2 frictionally coupled within the housing for movement relative to the housing, a load-bearing metal plate 3 embedded in and affixed to the resilient element, and a leveling screw 4 threaded through the center of the housing with the lower end engaging the upper surface of the load-bearing plate 3.

The leveling screw 4 carries a lock nut 5 and washer 6 for affixing the leveling mounting to a part 7 of the body which it is to support, for example, one of the legs of a machine. The housing 1 engages the bottom of the leg and the lock nut 5 is tightened, causing the washer to engage the top of the leg.

The resilient element 2, in the form in which it is shown in the drawings, is essentially a rectangular block of rubber or other resilient material having vertical slots 8 in its opposite end walls. The housing 1 is also rectangular in shape, and the inner surfaces of opposite ends walls carry elongated vertical ribs or guides 9 thereon which frictionally engage the slots in the resilient element when the resilient element is forced into the housing.

The frictional coupling between the resilient element and the housing is provided solely by the engagement of the sides of the slots with the opposite sides of the ribs. The slots are narrower than the ribs so as to grip the ribs with the desired pressure. The outer surfaces of the sidewalls of the resilient element are spaced apart from the sidewalls of the housing.

Also, the load-bearing plate 3 does not extend to the ends of the resilient element 2 so that it does not cover the upper ends of the slots 8 or engage the ribs 9.

The resilient element rests against the floor to support the leg 7 resiliently above the floor to minimize vibration. The leg can be raised or lowered to level the machine which is supported by adjustment of the leveling screw 4. If the leveling screw is turned in one direction it will lift the housing relative to the resilient mounting, and if it is turned in the opposite direction it will lower the housing with respect to the resilient element. The relative movement is resisted by the frictional engagement of the slots against the sides of the ribs, but this frictional engagement will yield to permit the leveling of the machine. Nevertheless, the frictional engagement is great enough to couple the resilient element within the housing and enable them to be handled as a unit before the mounting is attached to the machine which it is to support. The frictional coupling permits easy removal of the resilient element from the housing to replace the resilient element with another of greater or lesser load bearing capacity.

Another embodiment of the leveling mounting is illustrated in FIG. 4 which shows a housing 1 having a pair of pins 10 press fitted at their upper ends in the housing and depending downwardly into the housing. The load bearing plate 3 is provided with oversized holes which do not engage the pins. The resilient element 2 is provided with holes of smaller diameter than the pins so that the resilient element 2 frictionally engages the pins to hold the resilient element in place while permitting relative movement between the housing and resilient element for leveling purposes or for removal and replacement of the resilient element.

In the embodiment illustrated in FIG. 5, the pins are replaced by cap screws 11 threaded into the upper end of the housing with the heads 12 thereof depending downwardly within the housing. The holes in the load-bearing plate 3 are larger in diameter than the heads of the cap screws, but the diameters of the holes in the resilient element are less than the diameters of the capscrews so that the resilient element frictionally engages the heads of the capscrews.

The invention has been shown in preferred forms and by way of example only, and obviously many modifications and variations may be made therein.

I claim:

1. A resilient leveling mounting for supporting a body and minimizing vibration comprising a housing open at the bottom, a resilient element partly within the housing and engageable with the floor upon which the body is to be supported, a rigid plate affixed to the upper surface of the resilient element, a screw threaded through the housing with the lower end engaging the plate for securing the housing to the body to be supported and adjusting the position of the housing relative to the resilient element, and a friction coupling between the housing and the resilient element which resists relative movement therebetween to retain the resilient element within the housing but permits relative movement for adjusting the level of the body or the removal of the resilient element from the housing, said friction coupling including at least one pair of vertically extending ribs and at least one pair of vertically extending slots having walls which frictionally grip both sides of the ribs to resist relative movement between the housing and the resilient element and at the same time to serve as guides when the housing and the resilient element are moved relatively.

2. A leveling mounting as set forth in claim 1 in which the pair of vertically extending ribs are oppositely disposed and formed integrally on inner walls of the housing and the pair of vertically extending slots are formed on opposite side walls of the resilient element, the walls defining the slot being in frictional engagement with the side walls defining the ribs.